M. M. BROPHY.
ANTIROLLING DEVICE FOR MOTOR AND OTHER VEHICLES.
APPLICATION FILED APR. 24, 1916.
1,229,577.
Patented June 12, 1917.
2 SHEETS—SHEET 1.
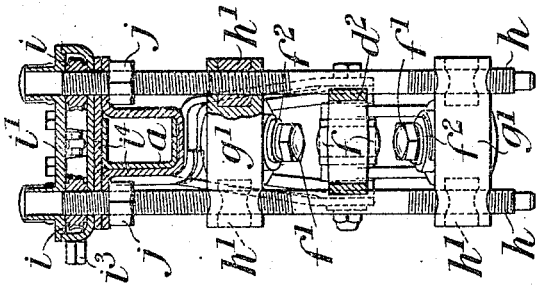
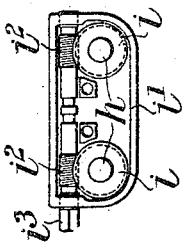
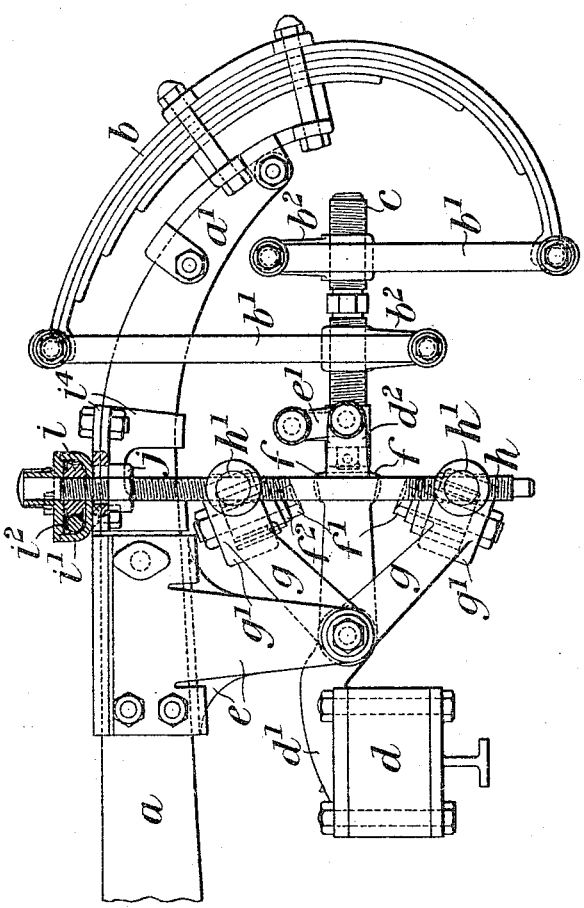
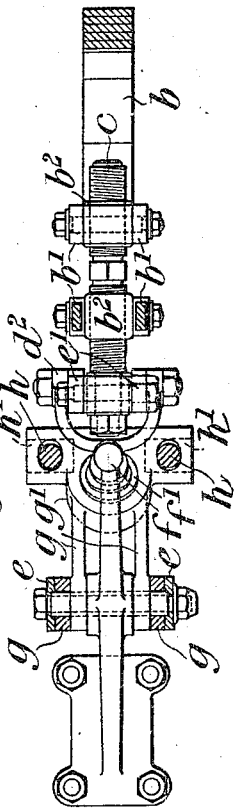
Witnesses.
Inventor.
Michael M. Brophy

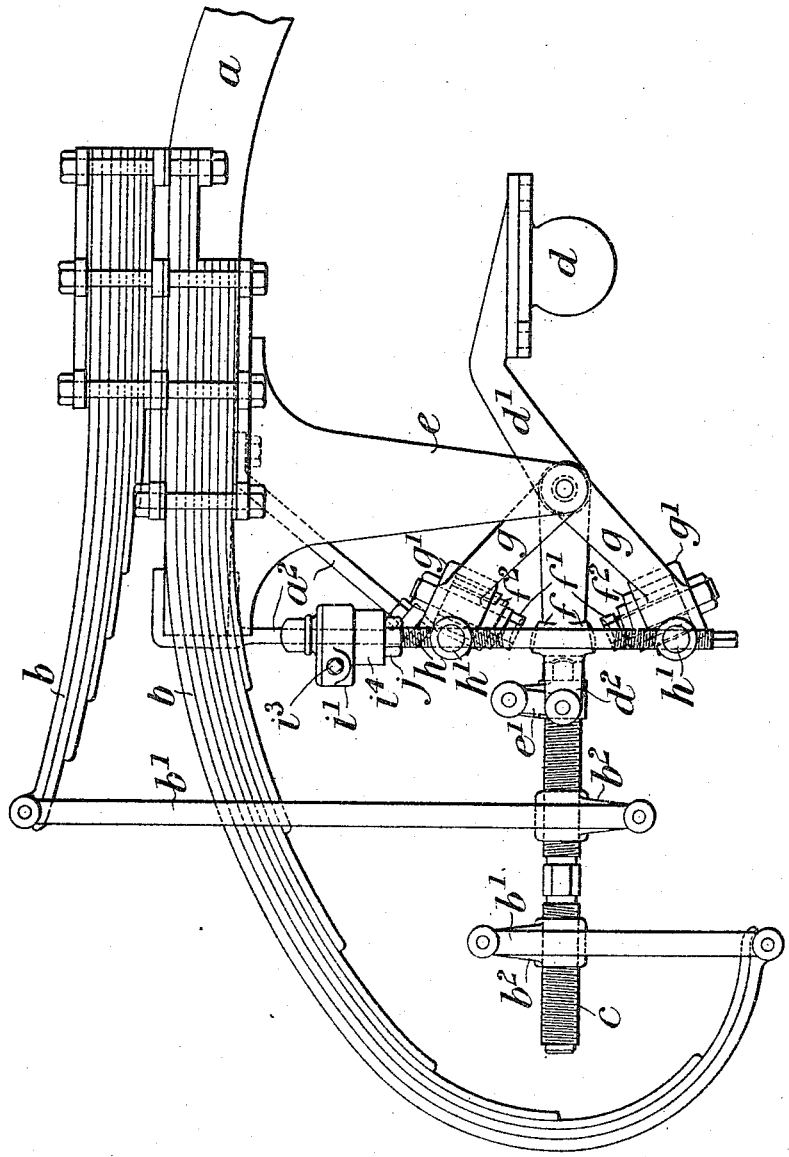

UNITED STATES PATENT OFFICE.

MICHAEL MARY BROPHY, OF MARGATE, ENGLAND.

ANTIROLLING DEVICE FOR MOTOR AND OTHER VEHICLES.

1,229,577. Specification of Letters Patent. Patented June 12, 1917.

Application filed April 24, 1916. Serial No. 93,278.

*To all whom it may concern:*

Be it known that I, MICHAEL MARY BROPHY, a subject of the King of Great Britain, residing at 48 Approach road, Margate, in the county of Kent, England, have invented new and useful Improvements in or Connected with Antirolling Devices for Motor and other Vehicles, of which the following is a specification.

My invention relates to anti-rolling devices for motor and other vehicles.

It is found in practice that the more sensitive the anti-vibration devices by which a vehicle is supported, the greater is the tendency for the chassis or body to roll or oscillate to an undue extent.

The object of my invention is to provide improved devices whereby the undue rolling or oscillating movement above referred to is prevented.

According to my invention I arrange upon the body or spring frame of the vehicle a series of sets of spring buffer stops which coöperate with abutments upon or in connection with the axle in such a manner that any rolling movement of the chassis or body produced either by the sudden reaction of the supporting springs or when turning a corner will cause the impingement of one or more of the abutments against the buffer stops whereby the rolling movement will be limited. The buffer stops of each set are so mounted that they can be adjusted with relation to one another, to place them nearer together or farther apart, according to the amount of roll or oscillation to be provided for, or that they can be moved bodily to permit of placing them in proper relation to the abutments according to the load on the vehicle.

To enable my invention to be fully understood I will describe the same by reference to the accompanying drawing, in which:—

Figure 1 is a side elevation illustrating the application of my invention in connection with anti-vibration or shock absorbing devices of the kind described in the specification of former Letters Patent granted to me No. 1,052,795 and arranged in connection with the front axle of a motor vehicle.

Fig. 2 is a sectional plan, and

Fig. 3 a sectional end view of the same.

Fig. 4 is a view of a detail.

Fig. 5 is a view similar to Fig. 1 of the arrangement of my invention in connection with the rear axle of a motor vehicle.

Referring first to Figs. 1 to 4 $a$ indicates one side of the front part of the chassis of a motor vehicle which terminates in a horn $a^1$ in the ordinary manner and $b$ a double plate spring carried on the said horn and connected by links $b^1$, $b^1$ with adjustable extensions $b^2$, $b^2$ upon a screw lever $c$, as described in the specification of my former Patent No. 1,052,795 in such a manner that, the rotation of the said screw will serve to vary the distance between the extension $b^2$, $b^2$ according to the load upon the vehicle and as described in the said former specification.

$d$ is the axle on which the stub axles for the spring wheels are pivoted in the usual manner, this axle, in accordance with my invention, having connected to it one end of a lever $d^1$ pivotally mounted between brackets $e$, $e$ while the other and bifurcated end $d^2$ of the said lever is connected by links $e^1$, $e^1$ with the adjacent end of the lever $c$, the said lever $d^1$ in its normal position being in alinement with the lever $c$, as shown. The end $d^2$ of the lever $d^1$ carries two abutments $f$, $f$ which coöperate with stops $f^1$, $f^1$ carried by arms $g$, $g$ pivoted on the axis of the lever $d^1$, the said stops $f^1$, $f^1$ being arranged in conjunction with springs $f^2$ to slide in sockets $g^1$, $g^1$ on the free ends of the lever or stop arms $g$. The said arms $g$ are adapted to be separated or moved closer together according to the limit of roll of the vehicle to be provided for, and for this purpose screws $h$, $h$ having right and left hand threads upon them, are engaged with nuts $h^1$ pivotally carried in bosses on the sockets $g^1$ of the stop arms $g$, as clearly indicated in Fig. 3.

Duplicate screws $h$ and nuts $h^1$ are advantageously arranged in connection with each pair of stop arms $g$ with the spring stops $f^1$ between the said screws, the rotation of which serves to simultaneously move the said stop arms away from or toward the abutments $f$ as required.

To allow the stops $f^1$ to be bodily raised or lowered, without altering their relative position so that they shall normally occupy the proper position with relation to the abutments $f$ whatever may be the position of the latter when the vehicle is loaded, worm wheels $i$, $i$ formed as nuts to work upon the adjusting screws $h$ are provided, such worm wheels being located in a box or support $i^1$ and adapted to be rotated simultaneously by means of two worms $i^2$ on a common shaft $i^3$, as clearly shown in Fig. 4. This box or support is mounted on a bracket or clip $i^4$ upon the chassis $a$, for instance, as clearly shown in Figs. 1 and 3. As the adjustment of the stop arms $g$ by means of the screws $h$ will cause the movement of the latter toward or away from the fulcrum of the said arms the apertures in the bracket $i^4$ through which the screws pass, are elongated slightly and lock nuts $j$ are provided upon the screws for holding the said screws rigid after adjustment.

With the arrangement hereinbefore described it will be understood that the extent to which a vehicle is allowed to roll or oscillate is adjusted by the rotation of the screws $h$ for the purpose of regulating the distance between the spring stops $f^1$, for instance, by applying a spanner or handle to the lower square ends of the said screws. The adjustment having been effected the device, as a whole, can be raised or lowered by means of the worm gearing $i, i^2$ before described to suit the load upon a vehicle, so that when the vehicle is at rest the lever $d^1$ carrying the abutments $f$ shall occupy a central position with relation to the said spring stops similar to that illustrated.

The arrangement of my mechanism in conjunction with the rear axle of a vehicle is substantially the same as that hereinbefore described and will be clearly understood by reference to Fig. 5. The essential differences are that instead of using only a single plate spring $b$, two springs are arranged in connection with the lever $c$ and that the box $i^1$ containing the worm gearing is suspended by stays $a^2$ from the back of the chassis $a$ instead of being directly connected thereto as shown in Fig. 1.

Having now fully described and ascertained my said invention and the manner in which it is to be performed, I declare that what I claim is:—

1. The combination with a vehicle, of a lever carried by the axle of the same, means including a shock absorbing device connecting said lever to the vehicle chassis, and stops coöperating with said lever for preventing undue rolling motion of the chassis, under the influence of the shock absorbing device.

2. In a motor or other vehicle the combination with the framing of a pair of arms carrying stops and of a lever connected with the axle of the vehicle and carrying abutments operating in connection with such stops, means being provided for adjusting the said stops with relation to one another, substantially as described.

3. In a motor or other vehicle the combination with the framing of a pair of arms carrying stops and of a lever connected with the axle of the vehicle and carrying abutments operating in connection with such stops, means being provided for adjusting the said stops with relation to one another, and also for adjusting the stops with relation to the abutments upon the lever, substantially as, and for the purposes, described.

4. In a vehicle, a chassis, an axle, a lever rigidly mounted upon said axle and provided with abutments, means including a shock absorbing device connecting said lever with the chassis, and adjustable stops coöperating with said lever for preventing undue rolling motion of the chassis, under the influence of the shock absorbing device.

5. In a vehicle, a chassis, axles beneath the same, levers rigidly mounted upon said axles and provided with abutments, means including springs connecting the chassis to the levers, stops coöperating with said abutments for limiting the movement of the levers, and means carried by the chassis for adjusting said stops.

6. In a vehicle, a chassis, axles beneath the same, levers rigidly mounted upon said axles and provided with abutments, means including springs connecting the chassis to the levers, stops coöperating with said abutments for limiting the movement of the levers, and means carried by the chassis for simultaneously moving a pair of said stops toward or away from the abutments with which they coöperate.

7. In a vehicle, a chassis, axles mounted beneath said chassis, brackets suspended from said chassis, levers rigidly mounted on said axles and pivotally connected to said brackets, means including shock absorbing devices connecting said levers to said chassis, abutments provided upon the levers, arms mounted on the pivots connecting the levers and brackets, and stops carried by said arms coöperating with said abutments for limiting the movement of the levers.

8. In a vehicle, a chassis, axles mounted beneath said chassis, brackets suspended from said chassis, levers rigidly mounted on said axles and pivotally connected to said brackets, means including shock absorbing devices connecting said chassis and said levers, and means for limiting the movement of said levers.

MICHAEL MARY BROPHY.

Witnesses:
 JOHN E. BONSFIELD,
 A. ALBUTT.